(12) United States Patent
Ibrahim et al.

(10) Patent No.: US 10,298,931 B2
(45) Date of Patent: May 21, 2019

(54) COUPLING SAMPLE METADATA WITH MEDIA SAMPLES

(71) Applicant: Microsoft Corporation, Redmond, WA (US)

(72) Inventors: Ziyad A. Ibrahim, Redmond, WA (US); Yongjun Wu, Bellevue, WA (US); Shyam Sadhwani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 14/497,001

(22) Filed: Sep. 25, 2014

(65) Prior Publication Data

US 2016/0094847 A1 Mar. 31, 2016

(51) Int. Cl.
*H04N 19/132* (2014.01)
*H04N 19/196* (2014.01)
*G11B 27/30* (2006.01)

(52) U.S. Cl.
CPC ....... *H04N 19/132* (2014.11); *G11B 27/3036* (2013.01); *H04N 19/197* (2014.11)

(58) Field of Classification Search
CPC . H04N 19/132; H04N 19/197; G11B 27/3036
USPC .................................................. 375/240.02
See application file for complete search history.

(56) References Cited

U.S. PATENT DOCUMENTS 7,298,741 B2    11/2007  Hung
2002/0120634 A1*  8/2002  Min ................. G06F 17/30017

2004/0170162 A1*  9/2004  Hung ................ H04N 21/2365
                                                         370/389
2005/0289183 A1* 12/2005  Kaneko ............... G11B 27/034
2008/0159639 A1*  7/2008  Dvir ..................... H04N 19/176
                                                         382/236

(Continued)

FOREIGN PATENT DOCUMENTS

EP          2323392        5/2011

OTHER PUBLICATIONS

Fung. "Use Android Hardware Decoder with OMXCodec in NDK". Dec. 2012, pp. 1-12. https://vec.io/posts/useandroidhardwaredecoderwithomxcodecinndk.*

(Continued)

*Primary Examiner* — Zhihan Zhou
(74) *Attorney, Agent, or Firm* — Klarquist Sparkman, LLP (57) ABSTRACT

Innovations in the area of sample metadata processing can help a media playback tool avoid loss of synchronization between sample metadata and media samples. For example, a media playback tool identifies encoded data and sample metadata for a current media sample, then couples the sample metadata with the current media sample. The media playback tool provides the sample metadata and encoded data for the current media sample to a media decoder, which maintains the coupling between at least one element of the sample metadata and the current media sample during at least one stage of decoding, even when the current media sample is dropped, delayed, split, or repeated. For example, the media playback tool can determine whether to drop the current media sample and, if the current media sample is dropped, also drop the sample metadata that is coupled with the current media sample.

21 Claims, 6 Drawing Sheets software 180 implementing one or more innovations for coupling sample metadata with media samples (56) References Cited

U.S. PATENT DOCUMENTS

| | | | | |
|---|---|---|---|---|
| 2010/0272174 | A1* | 10/2010 | Toma | H04N 19/426 375/240.12 |
| 2011/0169966 | A1* | 7/2011 | Norman | H04N 17/004 348/194 |
| 2012/0099643 | A1* | 4/2012 | Karegoudar | H04N 19/46 375/240.06 |
| 2012/0230393 | A1 | 9/2012 | Naing et al. | |
| 2013/0047189 | A1 | 2/2013 | Raveendran et al. | |
| 2013/0195173 | A1 | 8/2013 | Wang et al. | |
| 2013/0304935 | A1 | 11/2013 | Chen et al. | |
| 2014/0185691 | A1 | 7/2014 | Kwon et al. | |

OTHER PUBLICATIONS

International Search Report and Written Opinion dated Dec. 10, 2015, from International Patent Application No. PCT/US2015/050323, 14 pp.
Techopedia, "What is Bootstrap," downloaded from the World Wide Web, 2 pp. (Jan. 2012).
Schierl et al., "System Layer Integration of High Efficiency Video Coding," *IEEE Trans. On Circuits and Systems for Video Technology*, vol. 22, No. 12, pp. 1871-1884 (Dec. 2012).
Sullivan et al., "Overview of the High Efficiency Video Coding (HEVC) Standard," *IEEE Trans. On Circuits and Systems for Video Technology*, vol. 22, No. 12, pp. 1649-1668 (Dec. 2012).
Telestream, Inc., "Telestream Announces Availability of HEVC Transcoding," Press Release, 2 pp. (Feb. 4, 2014).
Bankoski et al., "VP8 Data Format and Decoding Guide," RFC 6386, 304 pp. (Nov. 2011).
ISO/IEC 14496-10, "Information Technology—Coding of Audio-Visual Objects—Part 10: Advanced Video Coding," 720 pp. (May 2012).
ISO/IEC, "Information Technology—Coding of Audio-Visual Objects—Part 12: ISO Base Media File Format," ISO/IEC 14496-12, 120 pp. (Oct. 2008).
ISO/IEC, "Information Technology—Coding of Audio-Visual Objects—Part 14: MP4 File Format," ISO/IEC 14496-14, 18 pp. (Nov. 2003).
ISO/IEC, "Information Technology—Coding of Audio-Visual Objects—Part 15: Advanced Video Coding (AVC) File Format," ISO/IEC 14496-15, 29 pp. (Apr. 2004).
ISO/IEC, "Information Technology—Dynamic Adaptive Streaming Over HTTP (DASH)," ISO/IEC 23009-1, 152 pp. (May 2014).
ISO/IEC, "Information Technology—Generic Coding of Moving Pictures and Associated Audio Information: Systems," ISO/IEC 13818-1, 171 pp. (Dec. 2000).
ITU-T Recommendation H.265, "High Efficiency Video Coding," 317 pp. (Apr. 2013).
Microsoft Corporation, "Advanced Systems Format (ASF) Specification," revision Jan. 20, 2006, 104 pp. (Jan. 2012).
Microsoft Corporation, "IIS Smooth Streaming Transport Protocol," MS-SMTH, 55 pp. (2009).
Microsoft Corporation, "RTP Payload Format for RT Video Streams Extensions," MS-RTVPF, 36 pp. (2014).
Noe, "Matroska File Format (Under Construction!)," 48 pp. (2009).
Pantos, "HTTP Live Streaming," draft-pantos-http-live-streaming-12, 42 pp. (Oct. 14, 2013).
Schulzrinne et al., "RTP: A Transport Protocol for Real-Time Applications," IETF RFC 3550, 89 pp. (2003).
SMPTE Standard, "VC-1 Compressed Video Bitstream Format and Decoding Process," SMPTE 421M-2006, 493 pp. (Feb. 2006).
WebM Project, "Common Algorithm Interface," downloaded from http://www.webmproject.org/tools/vp8-sdk/group_codec.html, 9 pp. (document marked Oct. 28, 2009).
Written Opinion of the International Preliminary Examining Authority dated Aug. 30, 2016, from International Patent Application No. PCT/US2015/050323, 9 pp.
International Preliminary Report on Patentability dated Dec. 15, 2016, from International Patent Application No. PCT/US2015/050323, 21 pp.
Communication pursuant to Rule 161(1) and 162 EPC dated Jun. 2, 2017, from European Patent Application No. 15778797.9, 2 pp.

* cited by examiner

FIG. 1 software 180 implementing one or more innovations
for coupling sample metadata with media samples

```
Status FeedSource(const BYTE *pBuffer, size_t Bufferlength, SampleMetadata& metadata);
```

```
struct SampleMetadata
{
    enum
    {
        METADATAFLAG_TIMESTAMP = 0x1,
        METADATAFLAG_MAX_RESOLUTION = 0x2,
    };

__int64 ui64PresentationTimeStamp;
    __int64 uiPictureDuration;  // one picture's duration, not one frame unsigned __int32 uiMaxDecodeWidth;
    unsigned __int32 uiMaxDecodeHeight;

unsigned __int32 Flags; // hold max of 32 flags
};
```

FIG. 5

COUPLING SAMPLE METADATA WITH MEDIA SAMPLES

BACKGROUND

Engineers use compression (also called source coding or source encoding) to reduce the bit rate of digital media data. Compression decreases the cost of storing and transmitting media data by converting the media data into a lower bit rate form. Decompression (also called decoding) reconstructs a version of the original media data from the compressed form. A "codec" is an encoder/decoder system. Over the last two decades, various video codec standards and formats have been adopted, and various audio codec standards and formats have been adopted. A codec standard or format typically defines options for the syntax of an encoded media bit stream (sometimes called a media elementary bit stream), detailing parameters in the media elementary bit stream when particular features are used in encoding and decoding. In many cases, a codec standard or format also provides details about the decoding operations a media decoder should perform to achieve correct results in decoding.

A media container format or streaming media format specifies how to organize encoded media data for storage, transmission, etc. A media container format or streaming media format can include fields for metadata about the encoded media data, such as timestamps used to regulate the timing of decoding or presentation, digital rights management data, playback control data or other data indicating how to decode or render the media data. Various media container formats have been promulgated for media data, including MPEG-2 TS/PS as defined in ITU-T H.222.0|ISO/IEC 13818-1, Advanced Systems Format ("ASF") (formerly Advanced Streaming Format), MPEG-4 ("MP4") as defined in ISO/IEC 14496-12 (ISO base media file format), 14496-14 (MP4 file format) and 14496-15 (AVC file format), Common File Format ("CFF") and Matroska Video Format ("MKV"). Various streaming media formats have also been promulgated for media data, including MPEG-DASH, HTTP Live Streaming ("HLS"), Smooth Streaming and variations of Real-time Transport Protocol ("RTP") (e.g., as defined in IETF RFC 3550 or another IETF RTP specification), which may include encoded media data in a container format file (such as MP4 or MPEG-2 TS) or in one or more media elementary bit streams. In general, a media source is a component that parses a media file or media stream, and provides encoded media data in a media elementary bit stream to a media decoder for decoding.

Every day, millions of media files and media streams are consumed by users through assorted activities. In some cases, a media file or media stream is corrupted due to random bit flips or packet loss during transmission. Or, a media file or media stream may be corrupted due to a storage failure, due to improper recording or for another reason. When media data in the media file or media stream is played back, a media decoder may drop a media sample (e.g., video frame) that cannot be decoded. Sample metadata associated with the media data may then lose synchronization relative to the media samples being decoded. This loss of metadata-media synchronization can cause problems with decoding or presentation, such as loss of audio/video synchronization or errors in reordering of media samples, which may depend on complicated reordering rules. Also, media files and media streams may be produced by diverse sources. Matching sample metadata to media samples can be challenging. Mistakes in mapping sample metadata to appropriate media samples can cause problems with media decoding, media presentation or media editing.

SUMMARY

In summary, innovations in the area of sample metadata processing are described herein. For example, a media playback tool couples sample metadata with corresponding media samples, and maintains the couplings between at least some elements of the sample metadata and the corresponding media samples during various stages decoding and output processing, even when a media sample is dropped, delayed, split, or repeated.

According to one aspect of the innovations described herein, a media playback tool identifies, in a media elementary bit stream, encoded data for a current media sample. The media playback tool also identifies, from outside the media elementary bit stream, sample metadata for the current media sample. The media playback tool couples the sample metadata with the current media sample. The media playback tool concurrently provides the sample metadata and the encoded data for the current media sample to a media decoder.

According to another aspect of the innovations described herein, a media playback tool identifies encoded data for a current media sample, identifies sample metadata for the current media sample, and couples the sample metadata with the current media sample. The media playback tool maintains the coupling of at least one sample metadata element of the sample metadata with the current media sample during at least one stage of decoding performed for the current media sample. For example, the media playback tool can determine whether to drop the current media sample and, if the current media sample is dropped, also drop the sample metadata that is coupled with the current media sample. As another example, the media playback tool can determine whether to delay the current media sample and, if the current media sample is delayed, also delay the sample metadata that is coupled with the current media sample.

According to another aspect of the innovations described herein, a media playback tool includes a media source and a media decoder. The media source is configured to receive input data that is split into data units. The input data, which is organized according to a media container format or a streaming media format, includes encoded data in a media elementary bit stream for media samples as well as, for at least some of the media samples, sample metadata outside the media elementary bit stream. The media source associates given sample metadata with a given one of the data units, and couples the given sample metadata with a given one of the media samples that has encoded data starting in the given data unit. Then, the media source provides the given sample metadata and the encoded data for the given media sample to the media decoder.

The innovations described herein can be implemented as part of a method, as part of a computing system configured to perform the method or as part of tangible computer-readable media storing computer-executable instructions for causing a computing system programmed thereby to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

The detailed description presents innovations in the area of sample metadata processing. For example, according to some of the innovations, a media playback tool couples sample metadata with appropriate media samples, and maintains the couplings between at least some sample metadata elements of the sample metadata and corresponding media samples during various stages decoding and output processing, even when a media sample is dropped, delayed, split, or repeated. In this way, the media playback tool may avoid loss of synchronization between the sample metadata and media samples, which can lead to problems during media decoding, media presentation or media editing.

Although operations described herein are in places described as being performed by or in conjunction with a video playback tool, in many cases the operations can be performed by or in conjunction with another type of media playback tool (e.g., audio playback tool). More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
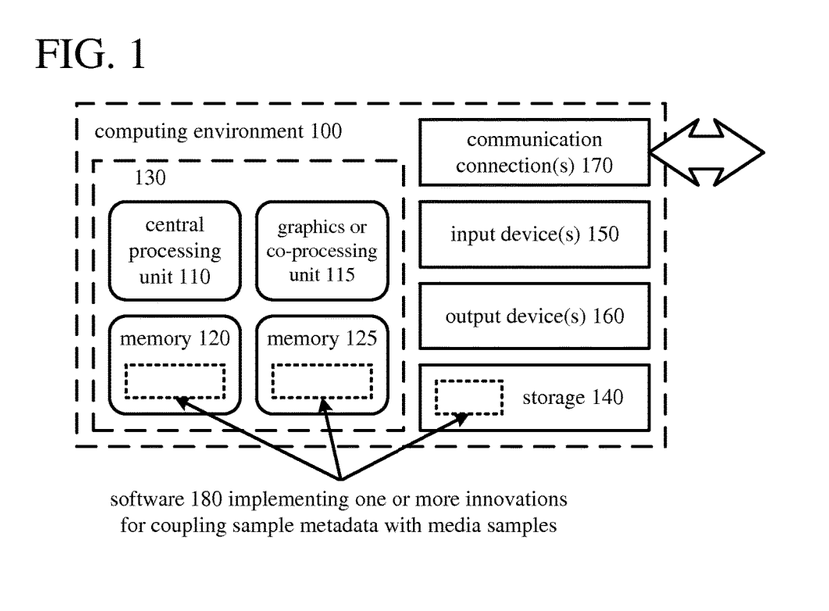
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for coupling sample metadata with media samples, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for coupling sample metadata with media samples.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed innovations.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
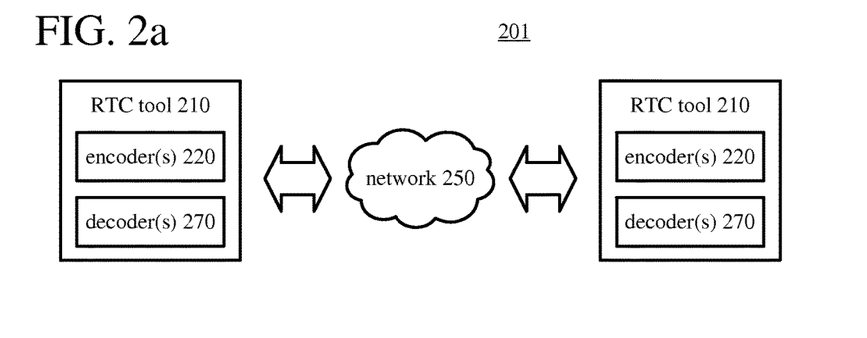
FIGS. 2a and 2b are diagrams of example network environments in which some described embodiments can be implemented.
Figure 2B:
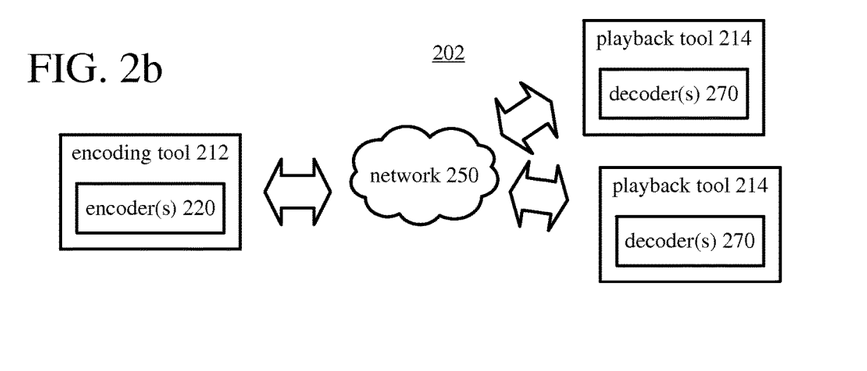

FIGS. 2a and 2b show example network environments (201, 202) that include media encoders (220) and media decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes one or more media encoders (220) and one or more media decoders (270) for bidirectional communication, as well as media sink and media source components (not shown). For video, a given encoder (220) can produce output compliant with a variation or extension of the H.265/HEVC standard, SMPTE 421M standard, ISO/IEC 14496-10 standard (also known as H.264/AVC), another standard, a VPx format (such as VP6, VP8 or VP9) or another proprietary format, with a corresponding decoder (270) accepting encoded data from the encoder (220). For audio, a given encoder (220) can produce output compliant with a variation or extension of the AAC standard (such as core AAC or HE AAC), AMR standard (such as AMR-WB), Opus standard, Silk standard, another standard, Windows Media Audio ("WMA") format, or another proprietary format, with a corresponding decoder (270) accepting encoded data from the encoder (220). A media sink processes encoded data for outgoing media samples according to a media container format or streaming media format, and a media source processes encoded data for incoming media samples according to the media container format or streaming media format. The bidirectional communication can be part of a video conference, video telephone call, or other two-party or multi-party communication scenario. Encoded media data can be formatted according to a variation of RTP (e.g., for audio, for H.265/HEVC video, for H.264/AVC video, for VP8 video), RTVideo, or another format or standard for media streaming. Although the network environment (201) in FIG. 2a includes two real-time communication tools (210), the network environment (201) can instead include three or more real-time communication tools (210) that participate in multi-party communication.

Figure 3:
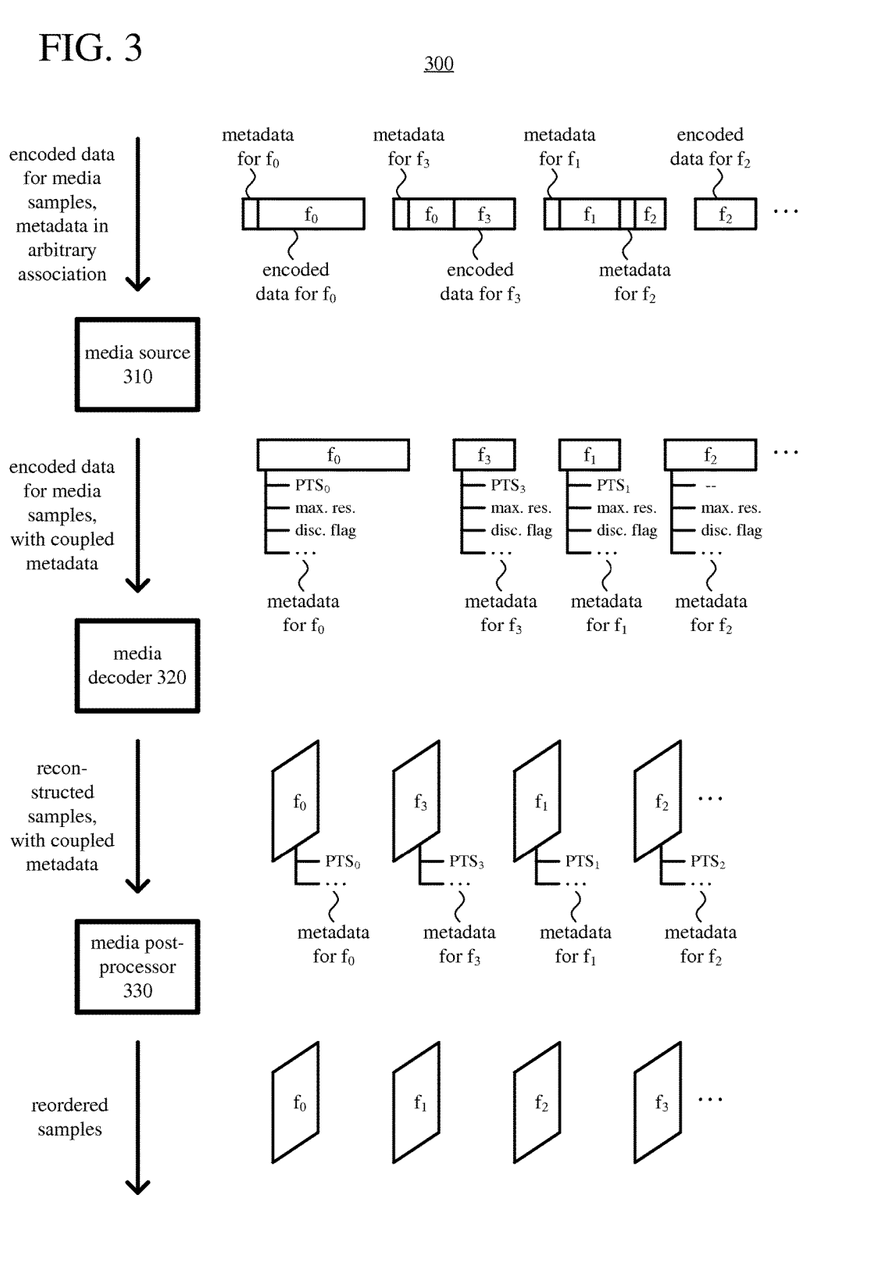
FIG. 3 is a diagram of an example media playback tool in conjunction with which some described embodiments can be implemented.

A real-time communication tool (210) manages encoding by an encoder (220) and also manages decoding by a decoder (270). FIG. 3 shows modules of an example media playback tool that can be included in the real-time communication tool (210) for media decoding and playback. Alternatively, the real-time communication tool (210) uses another media playback tool. FIG. 4 shows an example video decoder system (400), which can be included in the real-time communication tool (210) as part of the media playback tool. Alternatively, the real-time communication tool (210) uses another video decoder system.

In the network environment (202) shown in FIG. 2b, an encoding tool (212) includes one or more encoders (220) that encode media for delivery to multiple playback tools (214), which each include one or more decoders (270). The encoder(s) (220) can produce output compliant with any of the codec standards and formats described with reference to FIG. 2a, with the corresponding decoders (270) accepting encoded data from the encoder (220). In the encoding tool (212), a media sink (not shown) processes encoded data for outgoing media samples according to a media container format or streaming media format. In a playback tool (214), a media source (not shown) processes encoded data for incoming media samples according to the media container format or streaming media format. The unidirectional communication can be provided for a video surveillance system, web camera monitoring system, remote desktop conferencing presentation or other scenario in which media is encoded and sent from one location to one or more other locations. Encoded media data can be formatted according to a media container format (such as MPEG-2 TS/PS, ASF, MP4, CFF or MKV). Or, encoded media data can be formatted according to a streaming media format (such as MPEG-DASH, HLS or Smooth Streaming). Although the network environment (202) in FIG. 2b includes two playback tools (214), the network environment (202) can include more or fewer playback tools (214).

The encoding tool (212) can include server-side controller logic for managing connections with one or more playback tools (214), and a playback tool (214) can include client-side controller logic for managing connections with the encoding tool (212). In general, a playback tool (214) communicates with the encoding tool (212) to determine one or more streams of media data for the playback tool (214) to receive. The playback tool (214) receives the stream(s), buffers the received encoded data for an appropriate period, and begins decoding and playback. FIG. 3 shows modules of an example media playback tool that can be included in the playback tool (214) for media decoding and playback. Alternatively, the playback tool (214) uses another media playback tool. FIG. 4 shows an example video decoder system (400), which can be included in the playback tool (214) as part of the media playback tool. Alternatively, the playback tool (214) uses another video decoder system.

III. Coupling Sample Metadata with Media Samples.

This section describes innovations in the area of sample metadata processing, according to which a media playback tool couples sample metadata with corresponding media samples. The sample metadata for a media sample can include, for example, a presentation timestamp ("PTS"), a decoding timestamp ("DTS"), a frame presentation duration value, a maximum decodable spatial resolution, a pre-roll value, a discontinuity flag value, rotation data, three-dimensional display data, or other metadata to be used during decoding or presentation of the media sample. The media sample can be a video frame, audio frame or other type of media sample. For at least some metadata elements, the media playback tool can maintain the metadata-to-sample associations during various stages decoding and output processing. Depending on implementation, the sample metadata processing can provide various advantages to a media playback tool.

For example, a media playback tool can assign, to a media sample, sample metadata parsed from input data in any of various media container formats or streaming media formats. By accounting for different formats and different ways for the sample metadata to be provided, the media playback tool can assign the sample metadata to appropriate media samples in an accurate and efficient manner.

As another example, a media playback tool can tightly couple sample metadata with encoded data for a media sample throughout the decoding process, and continue to couple the sample metadata with a reconstructed version of the media sample for purposes of reordering and other output processing. If the media sample is dropped during decoding (e.g., due to data loss) or delayed during decoding (e.g., due to network congestion), the sample metadata can similarly be dropped or delayed, which can help avoid loss of synchronization for metadata processing, and thereby make the sample metadata processing more robust.

As another example, a media playback tool can support sample metadata processing in a variety of media consumption scenarios, including a media conference, media telephone call, other real-time communication, video surveillance system, web camera monitoring system, remote desktop conferencing presentation, or other media streaming. Input data can be formatted according to any of a variety of media container formats (such as MP4 or MPEG-2 TS) or streaming media formats (such as MPEG-DASH, HLS or RTP), and may be received over a lossy network connection.

As another example, a media playback tool can identify and replace missing sample metadata elements. For example, the media playback tool can interpolate between sample metadata elements (such as timestamps) to determine a replacement for a missing sample metadata element. In this way, in some cases, the media playback tool can recover from loss of metadata elements, corruption of metadata elements, or failure of a media sink or recording system to provide metadata elements.

As another example, a media playback tool can use sample metadata coupled to a media sample to verify compliance with a digital rights management ("DRM") rule or other form of content protection. For example, before decoding the encoded data for a media sample, the media playback tool checks that a maximum decodable spatial resolution indicated for the media sample is less than a maximum decodable spatial resolution under a DRM rule.

A. Example Media Playback Tools.

FIG. 3 is a block diagram of an example media playback tool (300) in conjunction with which some described embodiments may be implemented. The media playback tool (300) includes a media source (310), media decoder (320) and media post-processor (330). The media playback tool (300) can be a general-purpose media playback tool capable of operating in any of multiple playback modes such as a low-latency decoding mode for real-time communication and a higher-latency decoding mode for media playback from a file or stream, or it can be a special-purpose decoding tool adapted for one such decoding mode. The respective components of the media playback tool (300) can be implemented as part of an operating system module, as part of an application library, as part of a standalone application, or using special-purpose hardware. In particular, the media decoder (320) can be implemented, at least in part, using an ASIC, GPU or other special-purpose hardware for media decoding.

The media source (310) receives and parses input data organized according to a media container format or streaming media format. The media container format can be MPEG-2 TS/PS, ASF, MP4, CFF, MKV, or another media container format. The streaming media format can be MPEG-DASH, HLS, Smooth Streaming, a variation of RTP or another streaming media format. As shown in FIG. 3, the input data includes encoded data for media samples as well as sample metadata, which can have an arbitrary association with the corresponding media samples in the input data. In some media container formats (such as MP4), for example, different fields include encoded data for a media sample and sample metadata (such as a timestamp) for the media sample. For example, an index in a media file maps timestamps to media samples, apart from encoded data for the respective media samples. At least some of the encoded data for the media samples may be encrypted. Typically, the media source (310) will handle such encrypted content. Decryption of the encrypted content can happen in the media source (310), in the media decoder (320) or in some other component in the media playback tool (300). Decryption can be performed with software, or decryption can be offloaded to an ASIC, GPU or other special-purpose hardware for decryption.

Chunks of input data can have different sizes, e.g., from 1 to n bytes, where n depends on implementation. A chunk can include sample metadata as well as encoded data for all of a media sample. Or, a chunk can include sample metadata as well as encoded data for part of a media sample. Or, a chunk can include sample metadata as well as encoded data for at least part of each of multiple media samples. Or, a chunk can include only encoded data for at least part of one or more media samples. Encoded data can be partitioned into chunks in an arbitrary way, and sample metadata can be conveyed in arbitrary association with the encoded data. Chunks of input data can be received in arbitrary order, e.g., due to network delays. In FIG. 3, for example, a first chunk includes sample metadata for a first media sample $f_0$ as well as some of the encoded data for the first media sample $f_0$. A second chunk includes sample metadata for a fourth media sample $f_3$, the rest of the encoded data for the first media sample $f_0$, and the encoded data for the fourth media sample $f_3$. A third chunk includes sample metadata for a second media sample $f_1$, the encoded data for the second media sample $f_1$, sample metadata for a third media sample $f_2$, and some of the encoded data for the third media sample $f_2$. Finally, a fourth chunk includes the rest of the encoded data for the third media sample $f_2$.

From the input data, the media source (310) extracts sample metadata and encoded data for media samples. Depending on implementation, the media source (310) can de-packetize encoded data and sample metadata that have been aggregated for transmission as a media stream or for storage as a file, in which case the media source (310) parses syntax elements added as part of the syntax of the media file or media stream. Or, more generally, the media source (310) can implement one or more media demultiplexing protocols.

The media source (310) can associate sample metadata extracted from the chunks of input data with appropriate media samples in multiple steps. For example, for a given media sample, the media source (310) first associates sample metadata in a chunk of input data with a correct data unit or data units in the chunk. A data unit can be a network abstraction layer unit ("NALU") for H.264/AVC video or H.265/HEVC video, or another type of data unit. Then, from the identified data unit(s) in the chunk, and possibly from data unit(s) in one or more other chunks, the media source (310) couples the sample metadata with encoded data for the given media sample. In this way, for input data in any of various formats, sample metadata is reconstructed on a sample-by-sample basis and coupled to the appropriate media samples.

In the media source (310), a parser can identify media sample boundaries within the input data, e.g., at some of the data unit boundaries. In the example shown in FIG. 3, the encoded data for a given media sample starts in the chunk that includes the sample metadata for the given media sample, but need not finish in that chunk. The media source (310) extracts the sample metadata for the first media sample $f_0$, identifies data units with encoded data for the first media sample $f_0$ in the first and second chunks of input data, and couples the sample metadata with the encoded data for the first media sample $f_0$. From the second chunk, the media source (310) extracts the sample metadata for the fourth media sample $f_3$, and identifies any data units with encoded data for the fourth media sample $f_3$. The media source (310) couples the sample metadata with the encoded data for the fourth media sample $f_3$. From the third chunk, the media source (310) extracts the sample metadata for the second media sample $f_1$, identifies any data units with encoded data for the second media sample $f_1$, and couples the sample metadata with the encoded data for the second media sample $f_1$. The media source (310) also extracts the sample metadata for the third media sample $f_2$, identifies data units with encoded data for the third media sample $f_2$ in the third and fourth chunks, and couples the sample metadata with the encoded data for the third media sample $f_2$.

To couple sample metadata with a media sample, before decoding, the media playback tool can create an internal variable that includes one or more fields for the sample metadata and a field for the encoded data. During decoding, to couple sample metadata with the media sample, the media playback tool can create an internal variable that includes one or more fields for the sample metadata and one or more fields for decoding parameters and variables. After decoding, to couple sample metadata with the media sample, the media playback tool can create an internal variable that includes one or more fields for the sample metadata and a field for the reconstructed version of the media sample. The sample metadata can also be coupled with a media sample by using the sample metadata and encoded data for the media sample (or a reconstruction version of the media sample) together in a given function call.

The encoded data for the media samples, with coupled sample metadata, is organized in decoding order (also called coding order or input order, for input to an encoder), which is the order in which the media samples are decoded. In FIG. 3, the decoding order for the media samples is $f_0$, $f_3$, $f_1$, and $f_2$, which is different than the display order $f_0$, $f_1$, $f_2$, and $f_3$. The display order (also called output order) is the order in which the media samples are displayed. More generally, the decoding order for the media samples can be the same as the display order (in which case reordering is skipped after decoding) or different than the display order (in which case reconstructed samples are reordered after decoding). In particular, when coupling sample metadata with media samples for recent video codec formats (such as H.264/AVC, H.265/HEVC and VP9), the media source (310) accounts for hierarchical structuring of media samples (here, video frames) when associating sample metadata with the media samples.

The rate of sample metadata is not fixed, and metadata elements can be missing for one or more of the media samples due to loss of the metadata elements, corruption of the metadata elements, or failure of a media sink or recording system to provide the metadata elements. In FIG. 3, for example, one of the media samples ($f_2$) is missing a PTS. A missing metadata element can be replaced by interpolation between metadata elements or by repetition of a metadata element. For example, the media playback tool (300) can interpolate between two timestamps (DTSs, PTSs) to determine a replacement timestamp (DTS, PTS). Or, the media playback tool (300) can repeat a metadata element (e.g., maximum decodable spatial resolution) from a previous media sample. A missing metadata element can be replaced at various stages of processing (e.g., before decoding, during decoding, after decoding), depending on when the metadata element will be used. Thus, interpolation can use a number of samples buffered in the media playback tool (300), which may still be encoded (prior to decoding), may be partially decoded (in the process of being decoded) or may be decoded. Alternatively, the media playback tool (300) can ignore (not replace) a missing metadata element.

Typically, the media source (310) extracts sample metadata elements from a media file or media stream. In some cases, however, the media source (310) can determine sample metadata elements from settings of the media playback tool (300), settings of the media decoder (320), or other settings, or the media source (310) can derive sample metadata elements from encoded data for the media samples.

The media source (310) provides the encoded data for the media samples in a media elementary bit stream to the media decoder (320) for decoding, with sample metadata coupled to the appropriate media samples. For example, on a sample-by-sample basis, the media source (310) calls a function exposed by the media decoder (320), which accepts as inputs (a) encoded data for a media sample and (b) a structure that stores elements of sample metadata coupled with the media sample.

Figure 4A:
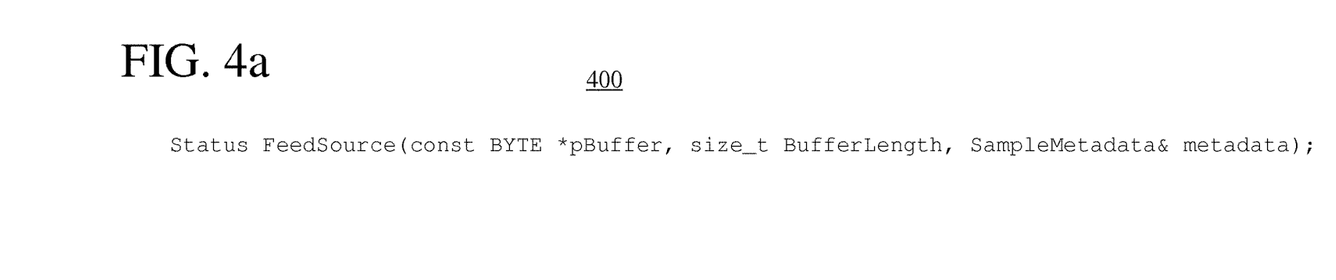
FIG. 4a is a pseudocode listing illustrating the footprint of a function exposed by a media decoder, which accepts as inputs encoded data for a media sample and a structure that stores elements of sample metadata coupled with the media sample.

FIG. 4a illustrates the footprint (400) of an example function exposed by the media decoder (320). The Feed-Source( ) function includes three input parameters—a pointer to an array of bytes (*pBuffer) for a buffer that stores encoded data for a given media sample, a length value (BufferLength) for the encoded data in the buffer, and a structure (Metadata) that stores sample metadata elements. The pointer and length value indicate the location and size of the encoded data for the media sample. Details of the Metadata structure are shown in FIG. 2b. The function returns a status value. Alternatively, the function exposed by the media decoder (320) can have a different footprint, e.g., with different input parameters for different sample metadata elements, or with sample metadata elements being passed by reference instead of passed by value.

Figure 4B:
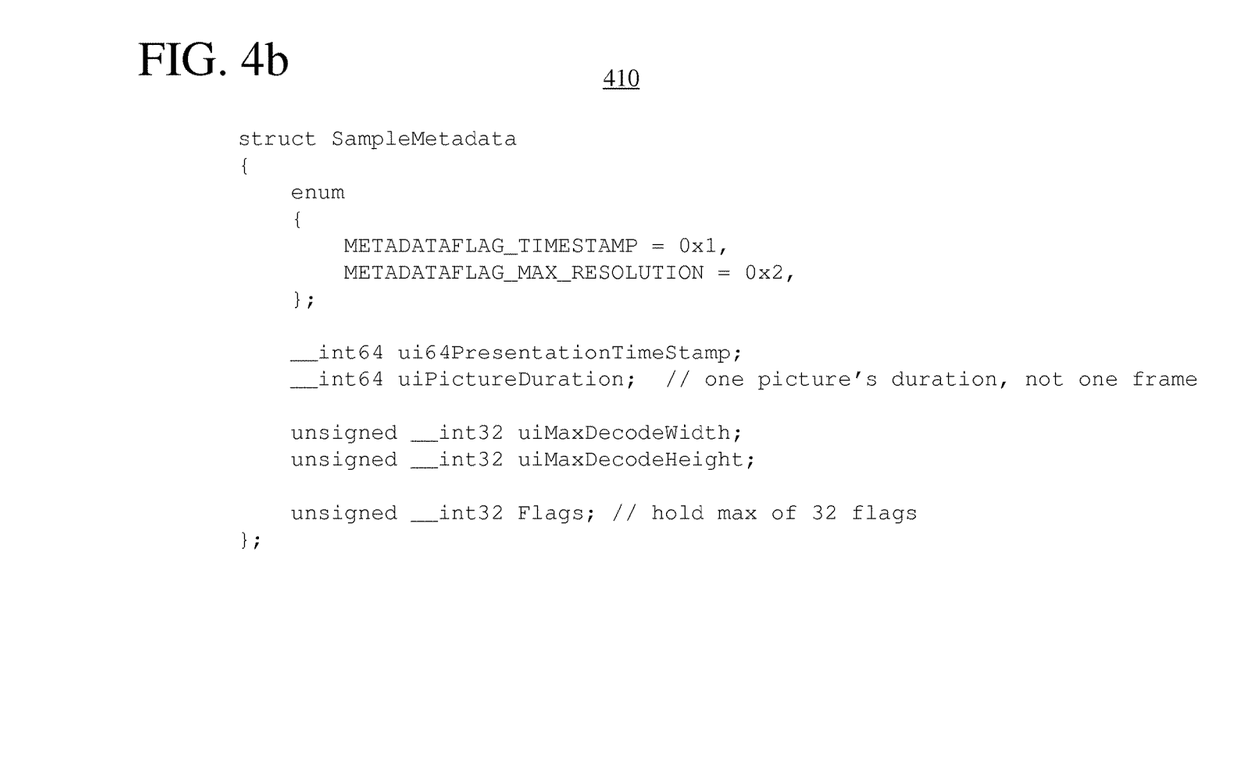
FIG. 4b is a pseudocode listing illustrating an example structure that stores elements of sample metadata.

FIG. 4b illustrates an example structure (410) that stores elements of sample metadata. The structure (410) includes fields for a PTS, a frame presentation duration value, and a maximum decodable spatial resolution (in width and height) for a media sample (here, a video frame). The structure (410)

also includes fields for flags (e.g., a discontinuity flag). Alternatively, the structure (410) can include other and/or additional types of sample metadata elements for use during decoding or presentation.

The media decoder (320) accepts the encoded data for the media samples, on a sample-by-sample basis, with sample metadata coupled to the respective media samples. In some cases, sample metadata can be omitted for a media sample—e.g., using an empty structure for sample metadata elements—if such sample metadata is not available. The media decoder (320) can be a video decoder (for H.265/HEVC, H.264/AVC, VPx or another format), audio decoder or other type of media decoder.

In general, sample metadata that is associated with encoded data for a media sample at the start of decoding remains associated with the media sample during decoding, although the media decoder (320) may consume some sample metadata elements during decoding. For example, the media decoder (320) can use a pre-roll value, discontinuity flag value or DTS during decoding of a media sample, but pass through other metadata elements such as a PTS for use in output processing operations.

The media decoder (320) produces reconstructed versions of the media samples, respectively, with sample metadata still coupled to the appropriate media samples. As shown in FIG. 3, some sample metadata elements can be discarded, if they are no longer used by the media playback tool (300). Alternatively, such sample metadata elements can be retained. The reconstructed versions of the media samples are produced in decoding order. Also, in FIG. 3, a missing PTS value has been replaced with a PTS value ($PTS_2$) determined by interpolating between two other PTS values ($PTS_1$ and $PTS_3$).

The media post-processor (330) performs output processing operations such as sample reordering, scaling of media samples, and rotation of media samples. The media post-processor (330) can consume some sample metadata elements, e.g., PTSs, rotation data, three-dimensional display metadata. For example, the media post-processor (330) uses PTSs and/or other syntax elements when reordering video frames in a decoded picture buffer ("DPB"). In FIG. 3, the media post-processor (330) outputs reordered media samples in display order. When it reorders media samples from decoding order to display order, the media post-processor (330) can concurrently reorder sample metadata coupled with the media samples.

In general, sample metadata can be coupled with appropriate media samples during processing by the media source (310), decoding with the media decoder (320) and output processing by the media post-processor (330). This simplifies handling of the sample metadata in various ways and can help avoid loss of synchronization between sample metadata and media samples, which otherwise might lead to problems with audio/video synchronization or sample reordering. In particular, problems of missing or delayed sample metadata can be severe for media samples of H.265/HEVC video, due to complicated picture dependencies. By coupling sample metadata with appropriate media samples before, during and after decoding, the media playback tool (300) can avoid such problems. For example, if a media sample is dropped for some reason (e.g., due to corruption of encoded data), the media playback tool (300) drops sample metadata coupled with the media sample. As another example, if a media sample is delayed for some reason (e.g., due to network congestion), the media playback tool (300) similarly delays sample metadata coupled with the media sample. As another example, if a media sample breaks into multiple new media samples for some reason (e.g., picture repetition, trick mode processing), sample metadata is coupled with one of the new media samples, but not the other new media sample(s). Thus, in general, the lifetime of sample metadata can be coextensive with the lifetime of the media sample to which the sample metadata is coupled. The media playback tool (300) can avoid situations in which it has more sample metadata than media samples or not enough sample metadata for media samples—instead maintaining a correct association between sample metadata and media samples.

B. Example Video Decoder Systems.

Figure 5:
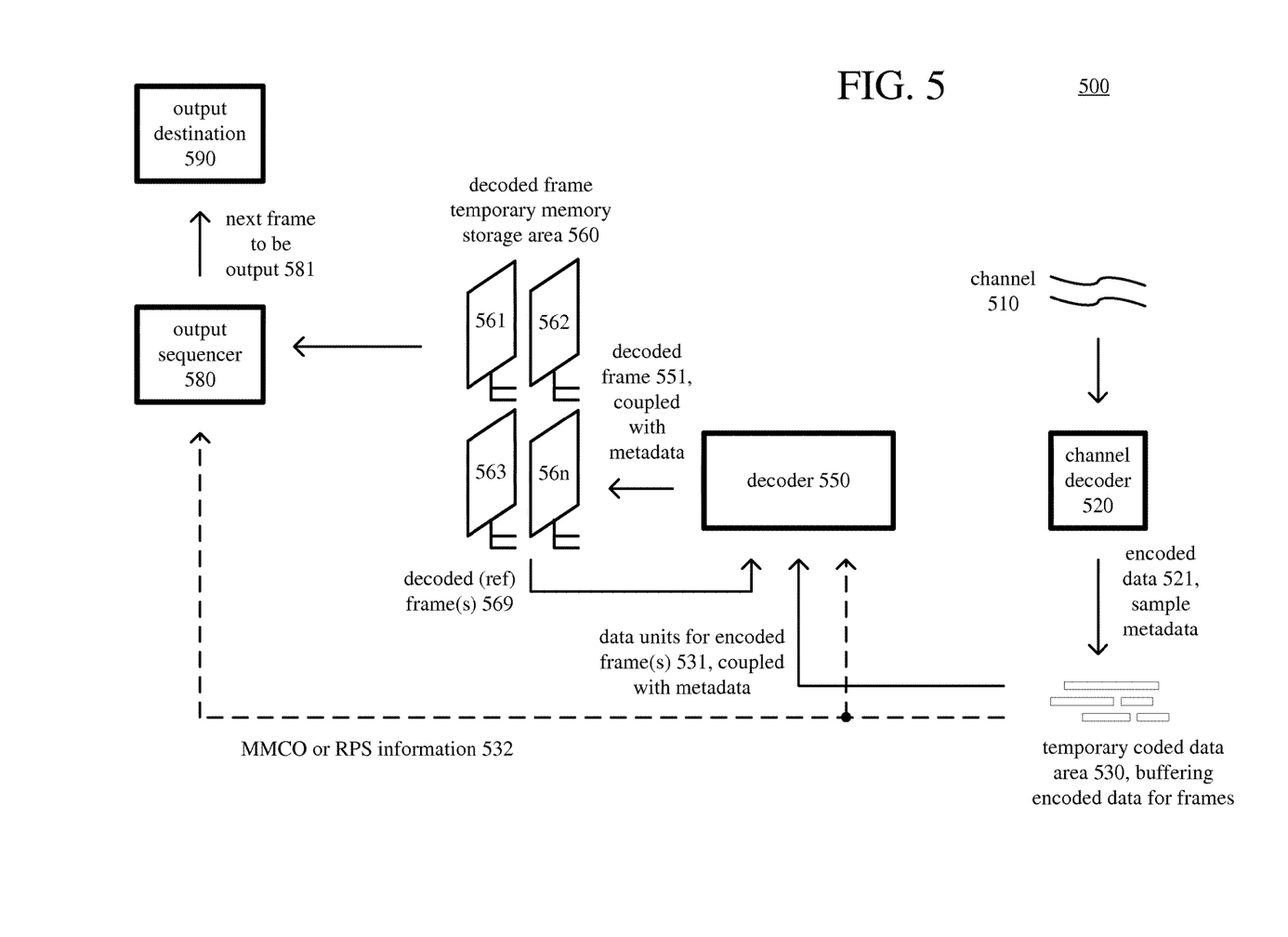
FIG. 5 is a diagram of an example video decoder system in conjunction with which some described embodiments can be implemented.

FIG. 5 is a block diagram of an example video decoder system (500) in conjunction with which some described embodiments may be implemented. The video decoder system (500) is an example of a media playback tool (300) as described with reference to FIG. 3. The video decoder system (500) can be a general-purpose video decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The video decoder system (500) can be implemented as part of an operating system module, as part of an application library, as part of a standalone application, or using special-purpose hardware. Overall, the decoder system (500) receives coded data from a channel (510) and produces reconstructed frames as output for an output destination (590).

The channel (510) can represent storage, a communications connection, or another channel for coded data as input. The channel (510) produces coded data that has been channel coded. A channel decoder (520), which is an example of a media source (310) as described with reference to FIG. 3, processes the coded data to extract sample metadata and encoded data for media samples. For example, the channel decoder (520) de-packetizes and/or demultiplexes data that has been aggregated for transmission or storage as a media stream (e.g., according to a media program stream or transport stream format such as MPEG-2 TS/PS or a variation of RTP format), in which case the channel decoder (520) can parse syntax elements added as part of the syntax of the media stream. Or, the channel decoder (520) separates coded media data that has been aggregated for storage as a file (e.g., according to a media container format such as MP4), in which case the channel decoder (520) can parse syntax elements added as part of the syntax of the media file. Or, more generally, the channel decoder (520) can implement one or more media system demultiplexing protocols or transport protocols, in which case the channel decoder (520) can parse syntax elements added as part of the syntax of the protocol(s). At least some of the encoded data for the media samples may be encrypted. Decryption of the encrypted content can happen in the channel decoder (520), in the decoder (550) or in some other component in the video decoder system (500). Decryption can be performed with software or special-purpose hardware configured for decryption. The channel (510) or channel decoder (520) may also include other elements (not shown), e.g., for FEC decoding and analog signal demodulation.

The encoded data (521) and sample metadata that are output from the channel decoder (520) are stored in a temporary coded data area (530) until a sufficient quantity of such data has been received. The encoded data (521) includes encoded frames (531), MMCO/RPS information (532) and sample metadata. The encoded data (521) in the coded data area (530) contains, as part of the syntax of an elementary coded video bit stream, encoded data for one or more frames. The coded data area (530) can also store sample metadata relating to the encoded data (521) for frames, which the video decoding system (500) couples with appropriate frames.

In general, the coded data area (530) temporarily stores encoded data (521) until such encoded data (521) is used by the decoder (550), which is an example of a media decoder (320) as described with reference to FIG. 3. At that point, encoded data for an encoded frame (531), with sample metadata coupled to it, and MMCO/RPS information (532) are transferred from the coded data area (530) to the decoder (550). As decoding continues, new encoded data (521) and sample metadata are added to the coded data area (530), and the oldest encoded data remaining in the coded data area (530) along with coupled sample metadata are transferred to the decoder (550).

The decoder (550) decodes an encoded frame (531) to produce a corresponding decoded frame (551), which is still coupled with sample metadata for the frame. As appropriate, when performing its decoding, the decoder (550) may use one or more previously decoded frames (569) as reference frames for inter-frame prediction. The decoder (550) reads such previously decoded frames (569) from a decoded frame temporary memory storage area (560). Generally, the decoder (550) includes multiple decoding modules that perform decoding tasks such as entropy decoding, intra-frame prediction, motion-compensated inter-frame prediction, inverse quantization, and inverse frequency transforms (if not skipped). The exact operations performed by the decoder (550) can vary depending on compression format.

For example, the decoder (550) receives encoded data for a compressed frame or sequence of frames and produces output including decoded frame (551), with sample metadata coupled to it. In the decoder (550), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra-frame prediction module can spatially predict sample values of a current block from neighboring, previously reconstructed sample values. The decoder (550) also reconstructs prediction residual values. An inverse quantizer inverse quantizes entropy-decoded data. For example, the decoder (550) sets values for QP for a picture, tile, slice and/or other portion of video based on syntax elements in the bit stream, and inverse quantizes transform coefficients accordingly. An inverse frequency transformer converts the quantized, frequency-domain data into spatial-domain data. In some implementations, the frequency transform can be skipped, in which case the inverse frequency transform is also skipped. If so, prediction residual values can be entropy decoded and inverse quantized. For an inter-frame predicted block, the decoder (550) combines reconstructed prediction residual values with motion-compensated prediction values. The decoder (550) can similarly combine prediction residual values with prediction values from intra prediction. An adaptive deblocking filter is included within the motion compensation loop in the video decoder (550) to smooth discontinuities across block boundary rows and/or columns in the decoded frame (551). Other filtering (such as de-ringing filtering, ALF, or SAO filtering; not shown) can alternatively or additionally be applied as in-loop filtering operations. The decoder (550) can consume some sample metadata elements during decoding, but passes other sample metadata elements through the decoder (550), still coupled to the appropriate frame. (The sample metadata elements consumed during decoding can remain coupled with the appropriate frame or be discarded.)

The decoded frame temporary memory storage area (560) includes multiple frame buffer storage areas (561, 562, . . . , 56n). The decoded frame storage area (560) is an example of a DPB. The decoder (550) uses the MMCO/RPS information (532) to identify a frame buffer (561, 562, etc.) in which it can store a decoded frame (551), with sample metadata coupled to it. The decoder (550) stores the decoded frame (551) with coupled sample metadata in that frame buffer.

An output sequencer (580), which is an example of a media post-processor (330) as described with reference to FIG. 3, identifies when the next frame to be produced in display order is available in the decoded frame storage area (560). When the next frame (581) to be produced in display order is available in the decoded frame storage area (560), it is read by the output sequencer (580) and output to the output destination (590) (e.g., display). In general, the order in which frames are output from the decoded frame storage area (560) by the output sequencer (580) may differ from the order in which the frames are decoded by the decoder (550). The output sequencer (580) can use PTS values and/or other syntax elements when reordering frames. Other post-processing operations (e.g., scaling, rotation) that may use sample metadata are not shown in FIG. 5.

C. Example Techniques for Sample Metadata Processing.

Figure 6:
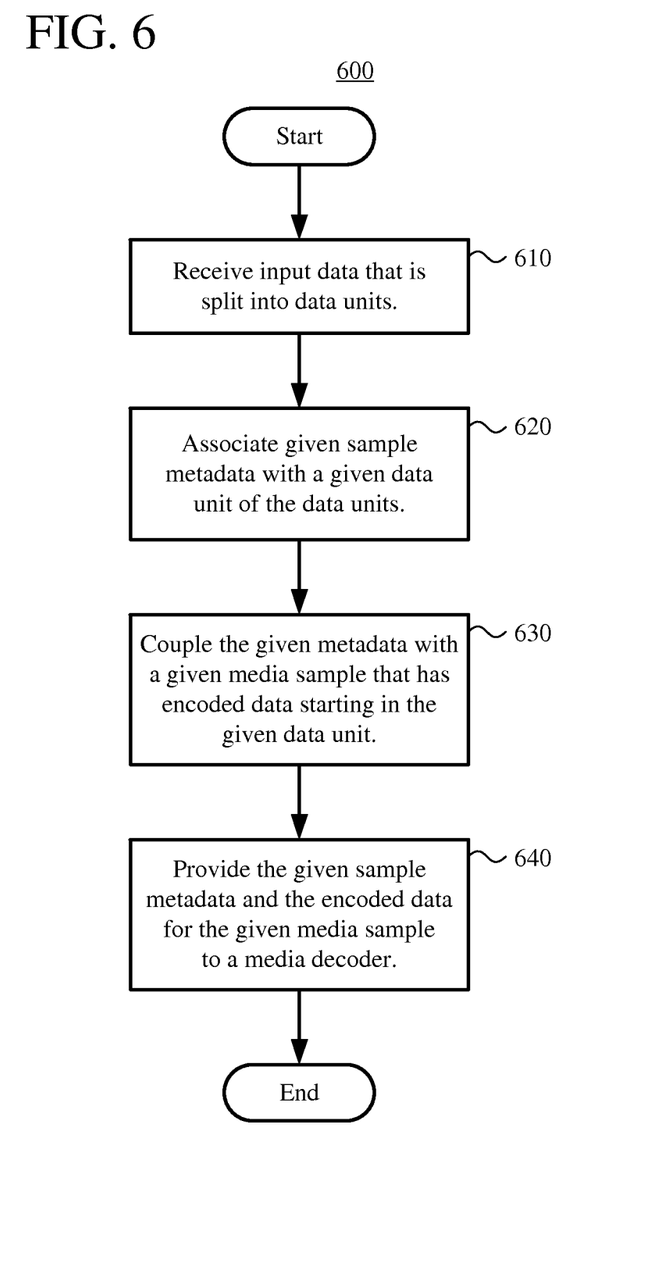
FIGS. 6-8 are flowcharts illustrating generalized techniques for processing sample metadata coupled with appropriate media samples.

FIG. 6 illustrates a first generalized technique (600) for processing sample metadata coupled with appropriate media samples. A media playback tool as described with reference to FIG. 3 or FIG. 5, or other media playback tool, can perform the technique (600). The focus of the technique (600) shown in FIG. 6 is identification of associations between sample metadata and appropriate media samples.

The media playback tool receives (610) input data that is split into data units. The input data is organized according to a media container format or a streaming media format. The input data includes encoded data in a media elementary bit stream for media samples. The input data also includes sample metadata outside the media elementary bit stream for at least some of the media samples.

The media playback tool associates (620) given sample metadata among the sample metadata with a given data unit of the data units. The media playback tool then couples (630) the given sample metadata with a given media sample (among the media samples) that has encoded data starting in the given data unit. For example, the given data unit is: (a) only part of the encoded data for a given media sample, (b) only all of the encoded data for the given media sample, or (c) at least some of the encoded data for the given media sample and at least some encoded data for one or more other media samples.

The media playback tool provides (640) the given sample metadata and the encoded data for the given media sample to a media decoder. In general, the lifetime of the given sample metadata can be coextensive with the lifetime of the given media sample during at least some of decoding and/or output processing stages. For example, the media decoder is configured to maintain the coupling of the given sample metadata with the given media sample even if the given media sample is dropped, delayed, or split. For the given media sample, the media playback tool can (a) determine whether to drop the given media sample and, in response to determining to drop the given media sample, also drop the given sample metadata, (b) determine whether to delay the given media sample and, in response to determining to delay the given media sample, also delay the given sample metadata, and/or (c) determine whether to split the given media sample into multiple new media samples and, in response to splitting the given media sample into multiple new media samples, assign the given sample metadata only to a first new media sample of the multiple new media samples and not to other ones of the multiple new media samples.

Figure 7:
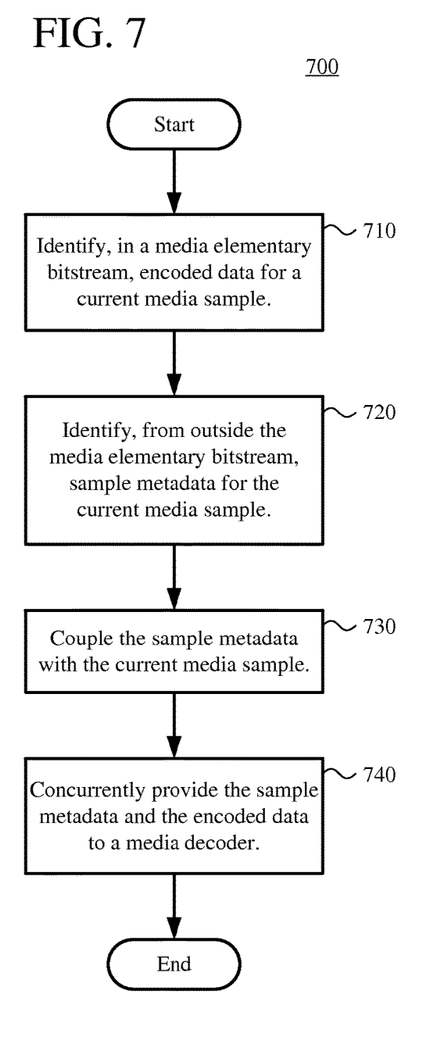

FIG. 7 illustrates a second generalized technique (700) for processing sample metadata coupled with appropriate media samples. A media playback tool as described with reference to FIG. 3 or FIG. 5, or other media playback tool, can perform the technique (700). The focus of the technique (700) shown in FIG. 7 is how sample metadata and encoded data for media samples are provided to a media decoder.

The media playback tool identifies (710), in a media elementary bit stream, encoded data for a current media sample. From outside the media elementary bit stream (e.g., in elements of a media file in a media container format or media stream in a streaming media format, or from settings of the media playback tool or media decoder), the media playback tool also identifies (720) sample metadata for the current media sample. The media playback tool couples (730) the sample metadata for the current media sample with the current media sample. For example, to do so, the media playback tool can determine an association between sample metadata and the current media sample using the technique (600) shown in FIG. 6. Alternatively, the media playback tool uses another approach to determine associations between sample metadata and appropriate media samples.

The media playback tool concurrently provides (740) the sample metadata for the current media sample and the encoded data for the current media sample to a media decoder. For example, the sample metadata and the encoded data are passed to the media decoder as parameters of a function call to a function exposed by the media decoder. The sample metadata can be passed as a structure in the function call, and the encoded data can be passed by reference using a pointer and a length value. Alternatively, the sample metadata and the encoded data are passed to the media decoder in some other way.

Then, the media playback tool can, with a media decoder, decode the encoded data for the current media sample to produce a reconstructed version of the current media sample. The media playback tool can also process the reconstructed version of the current media sample for output, e.g., performing sample reordering from decoding order (also called coding order or input order) to display order (also called output order). At least one sample metadata element of the sample metadata for the current media sample can remain coupled with the current media sample during the decoding. Such sample metadata element(s) can be consumed during the output processing. One or more other syntax elements can be consumed during the decoding. When the current media sample is reordered, relative to another media sample, from decoding order to display order, the media playback tool can reorder at least some of the sample metadata for the current media sample in parallel with reordering of the reconstructed version of the current media sample.

Figure 8:
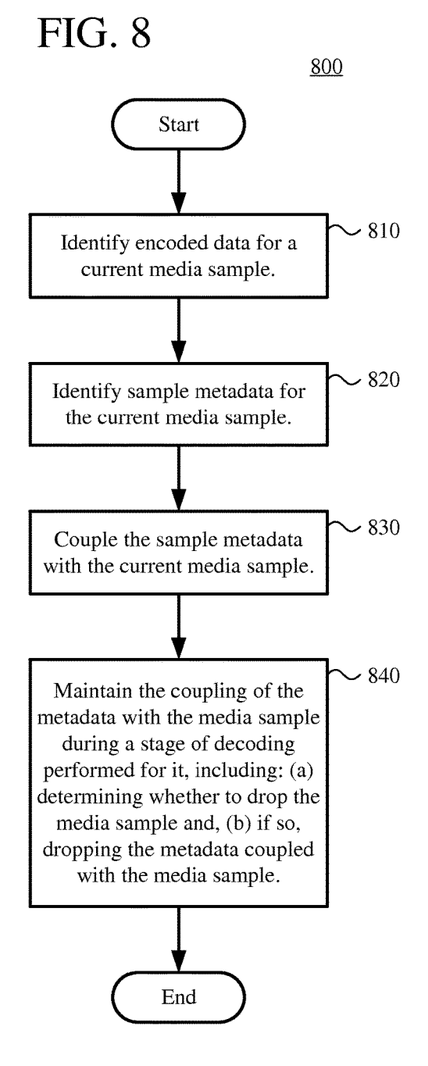

FIG. 8 illustrates a third generalized technique (800) for processing sample metadata coupled with appropriate media samples. A media playback tool as described with reference to FIG. 3 or FIG. 5, or other media playback tool, can perform the technique (800). The focus of the technique (800) shown in FIG. 8 is maintaining the coupling of sample metadata elements and appropriate media samples during decoding.

The media playback tool identifies (810) encoded data for a current media sample and identifies (820) sample metadata for the current media sample. The media playback tool couples (830) the sample metadata for the current media sample with the current media sample. For example, to do so, the media playback tool can determine an association between sample metadata and the current media sample using the technique (600) shown in FIG. 6. Alternatively, the media playback tool uses another approach to determine associations between sample metadata and appropriate media samples.

The media playback tool maintains (840) the coupling of at least one sample metadata element of the sample metadata for the current media sample with the current media sample during at least one stage of decoding performed for the current media sample. In doing so, the media playback tool determines whether to drop the current media sample and, if the current media sample is dropped, also drops the sample metadata that is coupled with the current media sample. The media playback tool can also determine whether to delay the current media sample and, if the current media sample is delayed, also delay the sample metadata that is coupled with the current media sample. While one or more sample metadata elements for the current media sample may pass through decoding, one or more other sample can be consumed during the decoding. The sample metadata element(s) that pass through the decoding can be consumed during output processing (e.g., for sample reordering).

With respect to the techniques (600, 700, 800) shown in FIGS. 6, 7 and 8, the sample metadata for the current media sample (or a given media sample) can include one or more of a PTS, a DTS, a frame presentation duration value, a maximum decodable spatial resolution value, a pre-roll flag value, a discontinuity flag value, rotation data and three-dimensional display data. Alternatively, the sample metadata for the current media sample (or given media sample) includes other and/or additional sample metadata elements.

With respect to the techniques (600, 700, 800) shown in FIGS. 6, 7 and 8, before, during or after decoding, the media playback tool can replace missing sample metadata elements. For example, the media playback tool can determine whether the current media sample is missing a sample metadata element (e.g., timestamp), and, in response to determining that the current media sample is missing a sample metadata element, interpolate between sample metadata elements (e.g., timestamps) for other media samples to determine a replacement for the missing sample metadata element.

With respect to the techniques (600, 700, 800) shown in FIGS. 6, 7 and 8, at least some of the encoded data for the media sample(s) may be encrypted. If so, the media playback tool decrypts the encrypted content before decoding of that encoded data. Decryption of the encrypted content can happen in a media source, media decoder or other component in the media playback tool.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing computer-executable instructions for causing a computing system, when programmed thereby, to perform operations, the one or more computer-readable media being selected from the group consisting of non-volatile memory, hard disk, CD-ROM, and DVD, the operations comprising:
   identifying, in a media elementary bit stream, encoded data for a current media sample;
   identifying, from outside the media elementary bit stream, sample metadata for the current media sample, wherein the sample metadata for the current media sample includes a timestamp and at least one other sample metadata element;
   coupling the sample metadata for the current media sample with the current media sample;
   concurrently providing the sample metadata for the current media sample and the encoded data for the current media sample to a media decoder that exposes a function having a footprint that defines input parameters, including passing in a function call, as two or more of the input parameters of the function exposed by the media decoder, the encoded data for the current media sample and the sample metadata for the current media sample;
   decoding the encoded data for the current media sample to produce a reconstructed version of the current media sample, wherein the timestamp and the at least one other sample metadata element of the sample metadata for the current media sample remain coupled with the current media sample during the decoding; and
   processing the reconstructed version of the current media sample for output, wherein the processing includes sample reordering from decoding order to display order, including, relative to another media sample, using the timestamp to reorder the at least one other sample metadata element for the current media sample in parallel with reordering of the reconstructed version of the current media sample.

2. The one or more computer-readable media of claim 1, wherein at least some of the sample metadata for the current media sample is consumed during the decoding.

3. The one or more computer-readable media of claim 1, wherein the timestamp is a presentation timestamp, and wherein the at least one other sample metadata element includes one or more of a frame presentation duration value, a maximum decodable spatial resolution value, a pre-roll flag value, a discontinuity flag value, rotation data and three-dimensional display data.

4. The one or more computer-readable media of claim 1, wherein the operations further comprise:
   determining whether the current media sample is missing a sample metadata element; and
   in response to determining that the current media sample is missing a sample metadata element, interpolating between sample metadata elements for other media samples to determine a replacement for the missing sample metadata element.

5. The one or more computer-readable media of claim 1, wherein, according to the footprint of the function exposed by the media decoder, the sample metadata for the current media sample is passed as a structure, and the encoded data for the current media sample is passed by reference using a pointer and a length value.

6. The one or more computer-readable media of claim 1, wherein the operations further comprise:
   receiving input data organized according to a media container format or a streaming media format, wherein the input data is split into one or more data units; and
   associating the sample metadata for the current media sample with a given data unit, among the one or more data units, in which the encoded data for the current media sample starts.

7. The one or more computer-readable media of claim 6, wherein the input data includes each of: the encoded data for the current media sample; encoded data for one or more other media samples; the sample metadata for the current media sample; and sample metadata for at least some of the one or more other media samples.

8. The one or more computer-readable media of claim 1, wherein the operations further comprise:
   determining whether to delay the current media sample; and
   in response to determining to delay the current media sample, also delaying the sample metadata for the current media sample.

9. The one or more computer-readable media of claim 1, wherein the operations further comprise:
   determining whether to split the current media sample into multiple new media samples; and
   in response to splitting the current media sample into the multiple new media samples, assigning the sample metadata for the current media sample only to a first new media sample of the multiple new media samples and not to any other ones of the multiple new media samples.

10. In a computing system, a method comprising:
    identifying, in a media elementary bit stream, encoded data for a current media sample;
    identifying, from outside the media elementary bit stream, sample metadata for the current media sample, the sample metadata for the current media sample including a timestamp and at least one other sample metadata element;
    coupling the sample metadata for the current media sample with the current media sample;
    concurrently providing the sample metadata for the current media sample and the encoded data for the current media sample to a media decoder;
    decoding the encoded data for the current media sample to produce a reconstructed version of the current media sample, wherein the timestamp and the at least one other sample metadata element of the sample metadata for the current media sample remain coupled with the current media sample during the decoding the encoded data for the current media sample; and
    processing the reconstructed version of the current media sample for output, including, relative to another media sample, using the timestamp to reorder the at least one other sample metadata element of the sample metadata for the current media sample from decoding order to display order in parallel with reordering of the reconstructed version of the current media sample from decoding order to display order.

11. The method of claim 10, further comprising:
    receiving input data organized according to a media container format or a streaming media format, wherein the input data is split into one or more data units; and
    associating the sample metadata for the current media sample with a given data unit, among the one or more data units, in which the encoded data for the current media sample starts.

12. The method of claim 10, further comprising:
    determining whether to delay the current media sample; and
    in response to determining to delay the current media sample, also delaying the sample metadata for the current media sample.

13. The method of claim 10, further comprising:
    determining whether to split the current media sample into multiple new media samples; and
    in response to splitting the current media sample into the multiple new media samples, assigning the sample metadata for the current media sample only to a first new media sample of the multiple new media samples and not to any other ones of the multiple new media samples.

14. A computing system comprising a processor and memory, wherein the computing system implements a media playback tool comprising:
    a media source configured to:
        identify, in a media elementary bit stream, encoded data for a current media sample;
        identify, from outside the media elementary bit stream, sample metadata for the current media sample, the sample metadata for the current media sample including a timestamp and at least one other sample metadata element;
        couple the sample metadata for the current media sample with the current media sample;
        concurrently provide the sample metadata for the current media sample and the encoded data for the current media sample to a media decoder;
    the media decoder, which is configured to decode the encoded data for the current media sample to produce a reconstructed version of the current media sample, with the timestamp and the at least one other sample metadata element of the sample metadata for the current media sample remaining coupled with the current media sample during decoding the encoded data for the current media sample; and
    a media post-processor configured to process the reconstructed version of the current media sample for output, wherein the media post-processor is configured to use the timestamp to reorder, relative to another media sample, the at least one other sample metadata element of the sample metadata for the current media sample from decoding order to display order in parallel with reordering of the reconstructed version of the current media sample from decoding order to display order.

15. The computing system of claim 14, wherein the media post-processor is further configured to:
    (a) determine to delay the current media sample and, in response, also delay the sample metadata for the current media sample; and/or
    (b) determine to split the current media sample into multiple new media samples and, in response, assign the sample metadata for the current media sample only to a first new media sample of the multiple new media samples and not to any other ones of the multiple new media samples.

16. The computing system of claim 14, wherein the media source is further configured to:
    determine whether the current media sample is missing a sample metadata element; and
    in response, interpolate between sample metadata elements for other media samples to determine a replacement for the missing sample metadata element.

17. A computing system comprising a processor and memory, wherein the computing system implements a media playback tool comprising:
    a media decoder that exposes a function having a footprint that defines input parameters wherein the media decoder is configured to decode encoded data for a current media sample to produce a reconstructed version of the current media sample;
    a media source configured to:
        identify, in a media elementary bit stream, the encoded data for the current media sample;
        identify, from outside the media elementary bit stream, sample metadata for the current media sample, wherein the sample metadata for the current media sample includes a timestamp and at least one other sample metadata element;
        couple the sample metadata for the current media sample with the current media sample; and
        concurrently provide the sample metadata for the current media sample and the encoded data for the current media sample to the media decoder, wherein the media source is configured to pass in a function call, as two or more of the input parameters of the function exposed by the media decoder, the encoded data for the current media sample and the sample metadata for the current media sample, and wherein the timestamp and the at least one other sample metadata element of the sample metadata for the current media sample remain coupled with the current media sample during at least one stage of decoding the encoded data for the current media sample; and
    a media post-processor configured to process the reconstructed version of the current media sample for output, wherein the media post-processor is configured to use the timestamp to reorder, relative to another media sample, the at least one other sample metadata element for the current media sample from decoding order to display order in parallel with reordering of the reconstructed version of the current media sample from decoding order to display order.

18. The computing system of claim 17, wherein the media post-processor is further configured to:
    (a) determine to delay the current media sample and, in response, also delay the sample metadata for the current media sample; and/or
    (b) determine to split the current media sample into multiple new media samples and, in response, assign the sample metadata for the current media sample only to a first new media sample of the multiple new media samples and not to any other ones of the multiple new media samples.

19. The computing system of claim 17, wherein the media source is further configured to:
    determine whether the current media sample is missing a sample metadata element; and
    in response, interpolate between sample metadata elements for other media samples to determine a replacement for the missing sample metadata element.

20. The computing system of claim 17, wherein, according to the footprint of the function exposed by the media decoder, the sample metadata for the current media sample is passed as a structure, and the encoded data for the current media sample is passed by reference using a pointer and a length value.

21. The computing system of claim 17, wherein the media source is further configured to:

receive input data organized according to a media container format or a streaming media format, wherein the input data is split into one or more data units; and associate the sample metadata for the current media sample with a given data unit, among the one or more data units, in which the encoded data for the current media sample starts.

\* \* \* \* \*